United States Patent [19]

Kohari

[11] Patent Number: 5,291,405
[45] Date of Patent: Mar. 1, 1994

[54] DOCUMENTATION MANAGEMENT SYSTEM

[75] Inventor: Yasushi Kohari, Iwatsuki, Japan
[73] Assignee: Fuji Xerox Co., Ltd., Tokyo, Japan
[21] Appl. No.: 595,880
[22] Filed: Oct. 10, 1990
[51] Int. Cl.⁵ .............................................. G06F 15/38
[52] U.S. Cl. ................................................ 364/419.19
[58] Field of Search ........................................ 364/419

[56] References Cited

U.S. PATENT DOCUMENTS

| | | | |
|---|---|---|---|
| 4,897,780 | 1/1990 | Lakness | 364/200 |
| 5,008,853 | 4/1991 | Bly et al. | 364/900 |
| 5,144,556 | 9/1992 | Wang et al. | 364/419 |

*Primary Examiner*—Roy N. Envall, Jr.
*Assistant Examiner*—Ari M. Bai
*Attorney, Agent, or Firm*—Finnegan, Henderson, Farabow, Garrett & Dunner

[57] ABSTRACT

A documentation management system including an optical disk for storing a predetermined format for a document and data entered in the document, an area setting device for setting in a predetermined portion of the format least one first area in which a person having a read right may read data, and at least one second area in which a person having a write right may write data, and a document processor having an input device to input the format and the data, and an output device for displaying the format and the data.

10 Claims, 9 Drawing Sheets

| LOGON OPTION SHEET | START | CANCEL |

NAME  ICHIRO IWAKI

PASSWORD  **********

FIG. 4

| PROTECTIVE FIELD PROPERTY | COMPLETED | CANCEL | RESET |

WRITE RIGHT
ICHIRO IWAKI
JIRO EBIHARA
SABURO KAWATA

READ RIGHT   ALL   DESIGNATE

SHIRO ODAISHI
GORO AKAMORI

PURCHASE REQUEST SHEET

| SEC. MANAGER | DEPT. MANAGER |
|---|---|

NOTE
(1) APPEND A PROPOSAL SHEET IN PURCHASING A PROPOSED ITEM.
(2) DO NOT ENTER OUTSIDE NECESSARY COLUMNS AND DO NOT DAMAGE THE SHEET.

| PRODUCT NAME | UNIT | NO. OF PIECES | PRICE |
|---|---|---|---|
|  |  |  |  |
|  |  |  |  |
|  | TOTAL |  |  |

FIG. 10

DOCUMENTATION MANAGEMENT SYSTEM

BACKGROUND OF THE INVENTION

Field of the Invention

The present invention relates to a documentation management system using document processors Such a word processors and work stations. More particularly, the present invention relates to a documentation management system suitable for managing preparation, routing, and approval of documents, such as routine approval slips and communication sheets, in which reading and writing are generally restricted to particular persons.

Discussion of the Related Art

Figure 10:
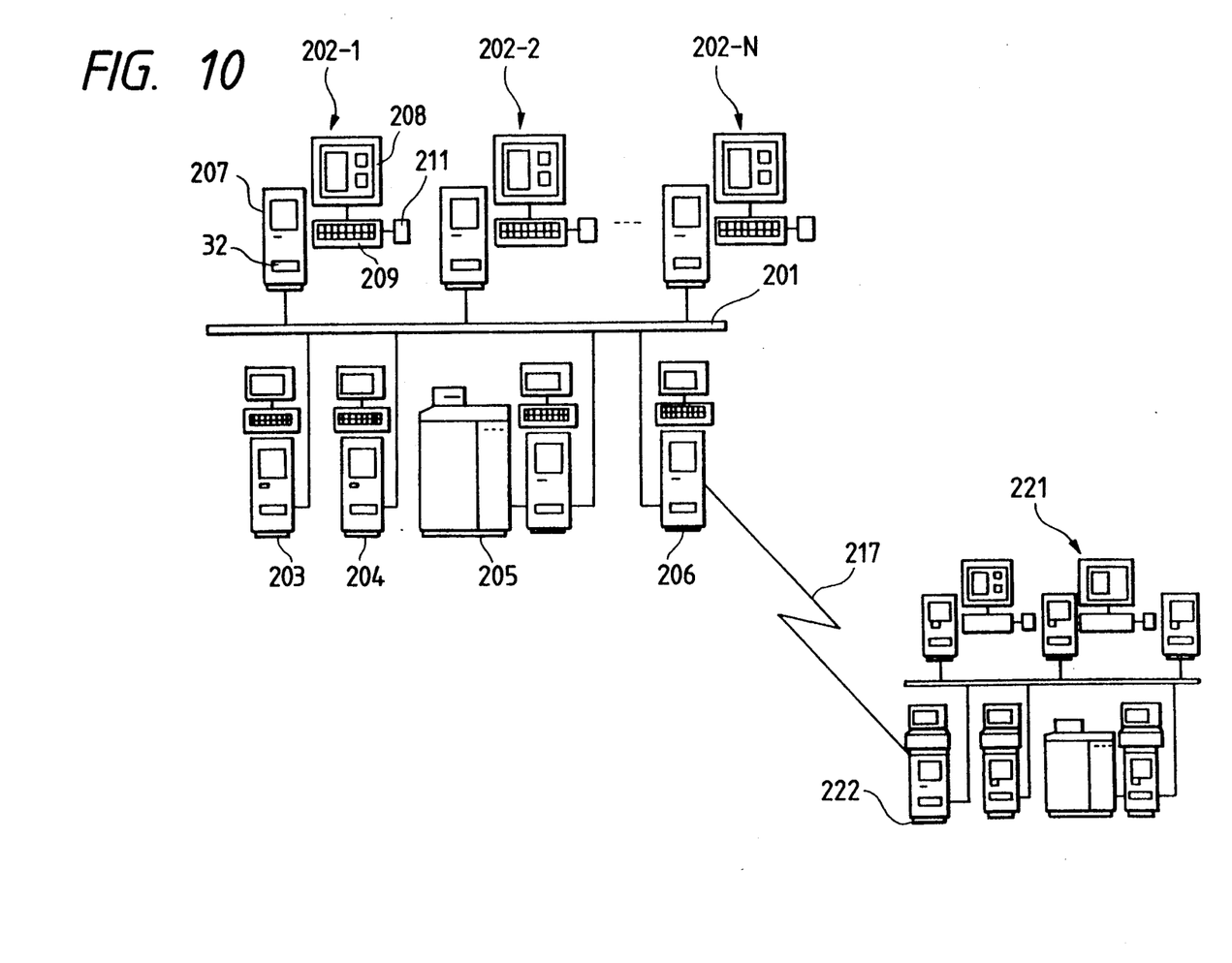
FIG. 10 is a system configuration diagram of a conventionally used document management system.

FIG. 10 illustrates a conventionally used documentation management system.

In this documentation management system, a plurality of work stations 202-1 to 202-N, a file server 203, a mail server 204, a print server 205, and a communication server 206 are respectively connected to a first communication cable 201 constituting a part of a local area network, such as an Ether net.

In the case of this example, each of the work stations 202-1 to 202-N comprises a controller main body 207, a display 208, a keyboard 209, and a mouse 211 serving as a pointing device. The file server 203 is used to store files used in common for this Ether net. The mail server 204 is used to effect management of electronic mail. The print server 205 includes, for instance, a laser printer, and is used to print out documents. The communication server 206 is used to communicate with other local area networks through a circuit 217. FIG. 10 shows the communication server 206 connected to a communication server 222, which is part of another local area network 221.

Electronic mail can be transmitted and received between work stations within the same local area network, and also between two connected local area networks.

Such a documentation management system is based on a premise that a plurality of persons are engaged in preparing documents within the system. Accordingly, access rights are introduced into the system to protect confidential documents and the like from others. An access right may be established for each document, or may be established for each directory or each conceptual folder. As used herein, the terms directory or folder refer to a unit in which a plurality of documents are arranged in each group.

The access right can be generally classified into (i) a "read right" and (ii) a "write right." A read right is a right to refer to a document, directory, or folder concerned (hereinafter simply referred to as the document). A write right is a right to write in the document.

If these access rights are introduced, it is possible to manage the system as follows.

First, by imparting the right to access a particular document or the like to a particular individual or group (hereinafter referred to as the member), it is possible to ensure the confidentiality of the document with respect to the other members, and to protect the document from being destroyed through an operation by other members.

In addition, by imparting only the read right to these members, it is possible to allow them to refer to the document, thereby making it possible to transmit information to them. Since these same members do not have the write right, they are only able to obtain information. Hence, it is possible to prevent the information from being altered through a rewriting of the document.

However, if such an access right is introduced, management of this system has been impossible with respect to certain kinds of documents. A description will be given of the management of bills in an accounting department as a typical example of such cases.

Ordinary bills may take a form in which a certain person enters contents on the bill, while another person approves it. Accordingly, the bill is provided with a portion where the contents are entered and a portion where approval is given. Hence, both the entrant and the approver have the right to access the document.

Accordingly, if the above described documentation management system is applied to the processing of bills, it would be possible for the person entering the contents, instead of the approver, to engage in a "writing" operation, giving approval to the contents, thereby making it possible to issue unauthorized bills.

Accordingly, in order to prevent the above problem, it has been necessary to engage in a troublesome operation. After the person enters the contents of the bill, the bill is printed out by the print server 205 (see FIG. 10). The approver affixes an approval stamp to the bill and hands it to accounting personnel. After confirming that the contents of the slip are appropriate, the accounting personnel deliver it to billing personnel, and the billing personnel input it to a computer to prepare an electronic document.

Although a description has been given of the management of preparation of bills in an accounting department, a similar problem exists in the management of other routine approval slips (hereinafter referred to as slips), and in preparation of other documents as well.

In particular, as shown in FIG. 10, in this system each member stores his or her own document in the file server 203 and reads it out by using his or her own work station 202-1 to 202-N and works on it, and then he or she can store it again in the file server 203 or print it out. Accordingly, in the case where the access right is set for each file or directory (hereinafter referred to as the "file") in the system using a server for storing documents, there has been the risk that an unauthorized person can access a document.

SUMMARY OF THE INVENTION

The present invention has been made in view of the above circumstances and has a primary object to provide a documentation management system adapted to store documents in a server and capable of managing documents for which approval of their contents is required.

A second object of the present invention is to provide a documentation management system adapted to store documents in a server and capable of managing slips.

A third object of the present invention is to provide a documentation management system adapted to store documents in a server and capable of positively preserving results of editing such as entry and deletion with respect to documents.

A fourth object of the present invention is to provide a documentation management system incorporated in a local area network.

A fifth object of the present invention is to provide a documentation management system arranged to more positively effect the management of preparation of documents in a local area network.

Additional objects and advantages of the invention will be set forth in part in the description which follows and in part will be obvious from the description, or may be learned by practice of the invention. The objects and advantages of the invention may be realized an attained by means of instrumentalities an combinations particularly pointed out in the appended claims.

To achieve the objects and in accordance with the purpose of the invention, as embodied and broadly described herein, a documentation management system is provided for controlling use of a document by a first group of operators having access to read the document, and a second group of operators having access to read and write on the document. The system includes first storage means for storing the document in a predetermined format, second storage means for storing data to be entered on the document, area designating means for designating in a portion of the document a first area, in which both the first and second groups of operators can read the data, and a second area in which only the second group of operators can write the data, and a document processor including input means connected to both storage means via a cable for inputting the document format and the data, and output means for displaying the document format and the data.

BRIEF DESCRIPTION OF THE DRAWINGS

The drawings, which are incorporated in and constitute a part of this specification, illustrate an embodiment of the invention and, together with the description, serve to explain the objects, advantages and principles of the invention. In the drawings.

FIG. 3 is a plan view illustrating the display of the screen when the work station of this documentation management system is logged on;

DETAILED DESCRIPTION OF THE PREFERRED EMBODIMENT

The documentation management system in accordance with a first aspect of the invention comprises: form storage means for storing a predetermined form of a document, data storage means for storing data entered in the form, area setting means for setting in a predetermined portion of the form at least one first area in which only a person having a read right is allowed to read data and at least one second area in which only a person having a write right is allowed to write data, and at least one document processor including input means connected to both of the storage means via a cable and adapted to input the form and the data and output means for reading and displaying the form and the data.

In accordance with the first aspect of the invention, area setting means is provided for setting in a predetermined portion of the form at least one first area in which only a person having a read right is allowed to read data and at least one second area in which only a person having a write right is allowed to write data. Accordingly, the scope of the persons allowed to read or write data with respect to the particular areas can be restricted even in one slip, thereby attaining the first object of the invention.

In accordance with a second aspect of the invention, the documentation management system comprises slip form storage means for storing a predetermined form of a slip, slip data storage means for storing slip data entered in the slip form, area setting means for setting in a predetermined portion of the slip form at least one first area in which only a person having a read right is allowed to read slip data and at least one second area in which only a person having a writing right is allowed to write the slip data, and at least one document processor including input means connected to both of the storage means via a cable and adapted to input the slip form and the slip data and output means for reading and displaying the slip form and the slip data.

In accordance with the second aspect of the invention, the form of the slip and the slip data are separately stored in the server-side storage means. Two areas, i.e., a first area and a second area, can be set for a slip in accordance with the authority of the operator, thereby attaining the second object of the invention.

In accordance with a third aspect of the invention, the form storage means and the data storage means used in the documentation management system in accordance with the first or second aspect of the invention are constituted by storage means incapable of rewriting, such a an optical disk, thereby attaining the third object of the invention.

In accordance with a fourth aspect of the invention, the form storage means and the data storage means are constituted by a file server connected to a cable of a local area network. Also, the document processor is constituted by a work station, thereby attaining the fourth object of the invention.

In accordance with a fifth aspect of the invention, a server used exclusively for processing slips is newly provided instead of the aforementioned file server, thereby attaining the fifth object of the invention.

Referring now to the accompanying drawings, a detailed description will be given of a preferred embodiment of the present invention.

Figure 2:
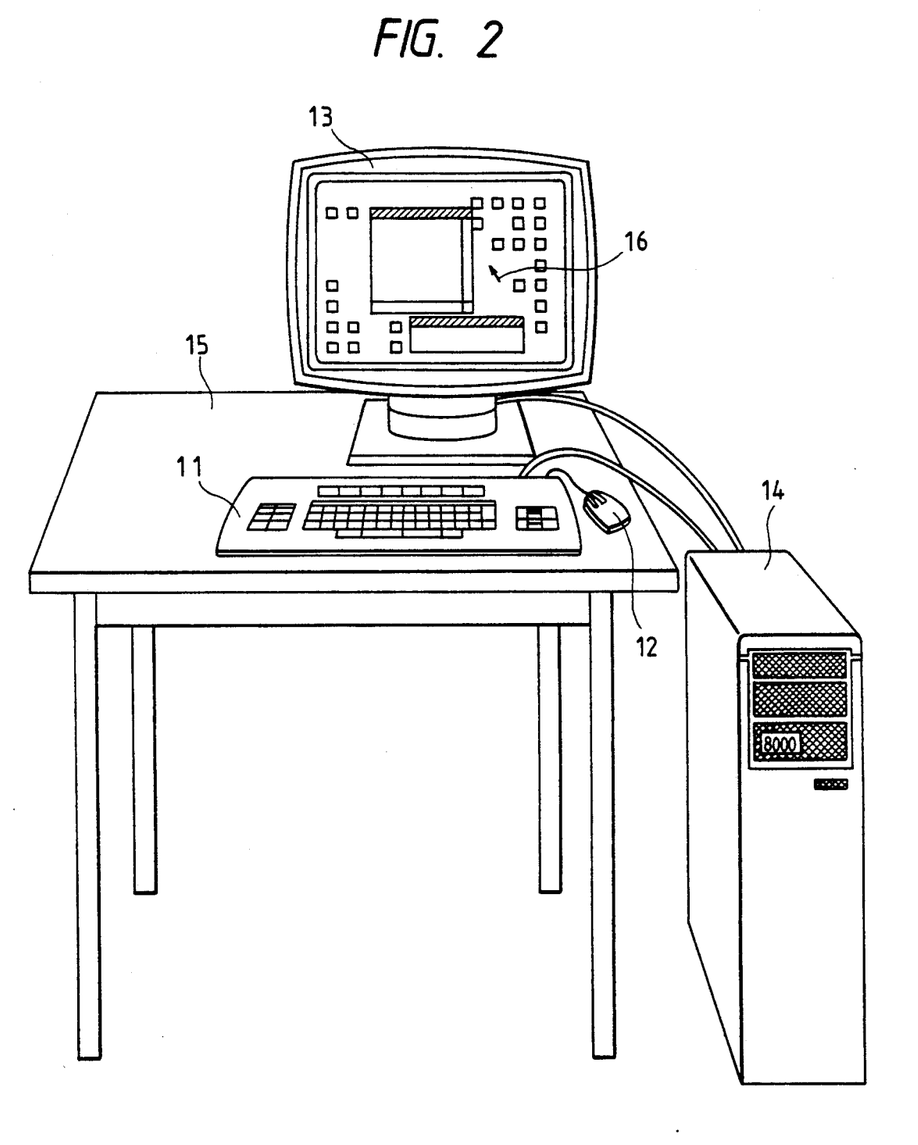
FIG. 2 is a perspective view illustrating essential portions of a work station disposed on a desk.

FIG. 2 schematically illustrates the external appearance of a document processor in accordance with an embodiment of the present invention. This document processor comprises a keyboard 11 and a mouse 12 both serving as input devices, a bit map display 13 serving as an output device, and a main body device 14 for effecting various items of control. The keyboard 11, the mouse 12, and the bit map display 13 are disposed on a work desk 15. This document processor is arranged to be connected, via a cable for an unillustrated local area network (LAN), to devices, such as a printer and various servers, which are used commonly with other document processors. Naturally, it is possible to print out necessary information by connecting an exclusive-use printer to the document processor without any intervention by the local area network.

A document to be retrieved can be displayed on the bit map display 13 in the form of the multi-window. Various processing can be executed by determining a position by the use of a cursor such as a graphic cursor 16. The mouse 12 is a pointing device. Circuit components such as a central processing unit (CPU) and a large-capacity external recording device are accommodated in the main-body device 14, as will be described below.

Figure 1:
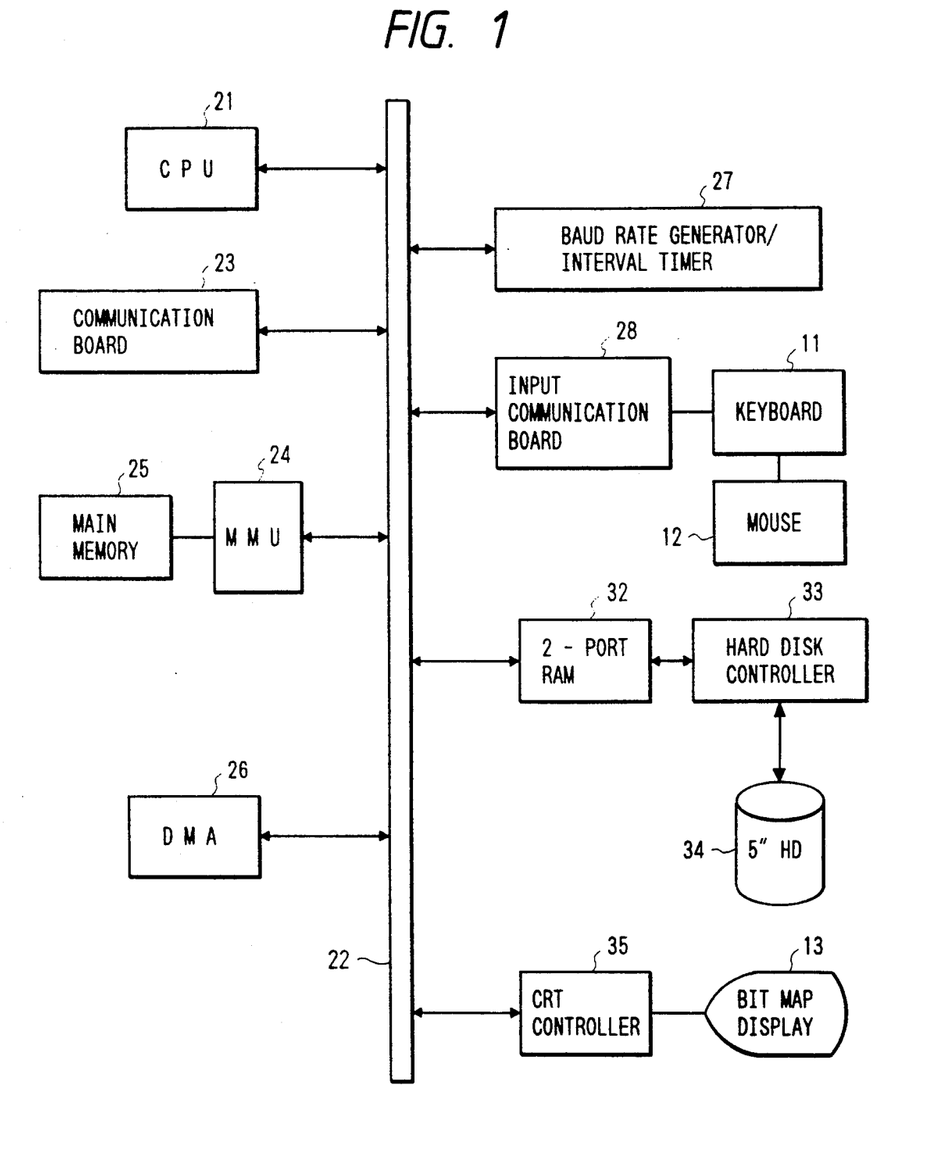
FIG. 1 is a block diagram schematically illustrating essential portions of a circuit configuration of a work station used in a documentation management system.

FIG. 1 illustrates essential components of a circuit configuration of this document processor. A central processor unit (CPU) 21 of this document processor is connected to the following circuit devices via a bus 22, and is arranged to effect various control of such operations as the preparation of texts and figures as well as the retrieval, replacement, and the like of character strings in documents being prepared.

(i) Communication board 23: A board used when this document processor effects communication with another device so as to effect printing of data or the like.

(ii) Memory management unit (MMU) 24: Effects control of the transmission of data to the bus 22 by reading the data from a main memory 25 constituted by a random access memory, as well as control of the storage of data in the main memory 25.

(iii) Direct memory access (DXA) 26: Effects control for directly transferring data between a peripheral device and the main memory 25.

(iv) Baud rate generator/interval timer 27: Generates a reference clock and generates a signal used for communication and timing operation.

(v) Input communication board 28: an interface circuit is connected to the keyboard 11 for data input. The mouse 12 serving as a pointing device is connected to the keyboard 11.

(vi) 2-port RAM 32: A buffer memory is connected to a 5-inch hard disk 34 via a hard disk controller 33. A control program for this document processor is stored in the 5-inch hard disk 34 and is stored in the main memory 25 so as to control various portions of the apparatus. Also, necessary data is stored in the 5-inch hard disk 34.

(vii) CRT controller 35: A controller for controlling the display of the bit map display (CRT) 13.

A description will now be given of a case in which the management of slip preparation is carried out by using the document processor configured as described above.

Figure 3:
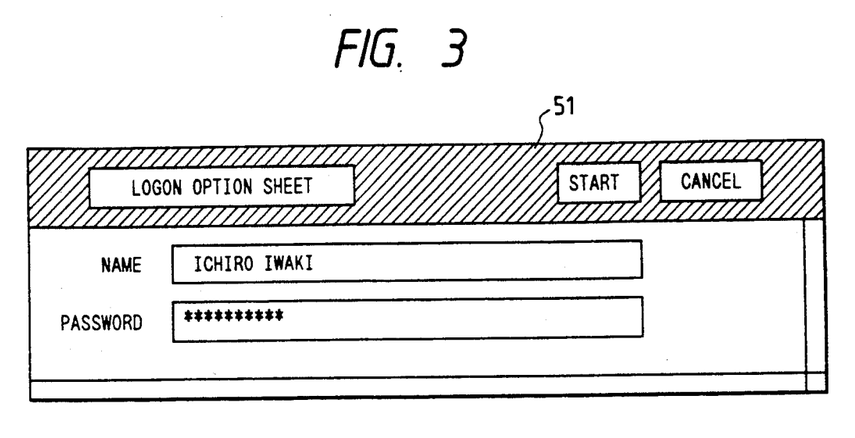

FIG. 3 illustrates a display screen at a time when a work station of this documentation management system is logged on. In other words, in a documentation management system having the same configuration as that of the system shown in FIG. 10, for example, if the operator of the first work station 202-1 presses a desired key of the keyboard 209, a window 51 for registering a user's name is displayed on its bit map display 13 (see FIG. 1).

Two commands, a "Start" command and a "Cancel" command, are displayed in an upper area of this window 51 for registering a user's name. In addition, the name of the operator as a user and a password set for this person are inputted below this upper area.

In this example, "Ichiro Iwaki" has been input as the name, and the password "**********" registered in the system with respect to this person has also been input. In this state, if the operator clicks the "Start" command by operating the mouse 12, the operation proceeds to an ensuing step. On the other hand, if the "Cancel" command is clicked, the display of this window 51 is canceled, and the operation returns to the state of the screen persisting prior to logon.

If the registration of the user's name is effected as shown in FIG. 3, the preparation of the form portion (slip form) of the slip is carried out. The slip form has two fields, a protection field and an entry field. The term field as used herein means the smallest unit for effecting reading and writing. The term "protective field" means a field for protecting a document by establishing the read right and the write right. The "entry field" means a field in which the person entering the contents of the slip makes an entry. Accordingly, the setting of the access right does not impact entry of data into the entry field.

Figure 4:
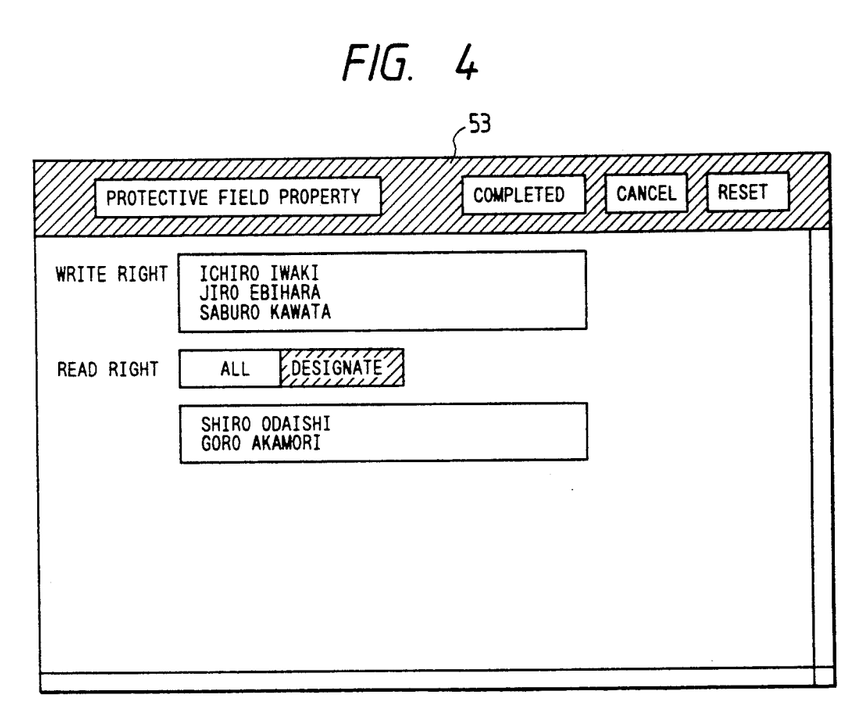
FIG. 4 is a plan view illustrating a window for inputting attributes of a protective field.

FIG. 4 illustrates a window for inputting the attributes of the protective field. If the operator requests insertion of the protective field in the form during preparation of the slip form, a window 53 for inserting a protective field is displayed. Three commands, i.e., a "Completed" command, a "Cancel" command, and a "Reset" command, are displayed in a upper area of the window 53 for inserting a protective window. The write right and the read write are set below this upper area.

Here, the "Completed" command is a command which is clicked when the write right is set. In addition, the "Cancel" command is a command for cancelling the insertion itself of the protective field. If this command is clicked, the display itself of the window 53 for inserting a protective field is canceled. On the other hand, the "Reset" command is designated when a re-entry is made by clearing the contents of the screen.

Entered in the entry column for the write right are the name of a person who is authorized to write in the protective field into which insertion is to be carried out or a member. The documentation management system of this embodiment includes as a premise that the write right naturally has the read right, so that a person for whom the write right is set is automatically provided with the read right as well. In this example, "Ichiro Iwaki" and two others have been entered as persons having the write right.

Meanwhile, the entry column for the read right has a first column for designating whether or not the scope of the persons to whom the read right is granted is restricted. Here, if it is assumed that the persons having the read right are to be designated as shown in the drawing, the names of the persons or members are entered in a second column. In this example, two other persons are entered as persons having the right in addition to the persons having the write right.

The form of the slip, thus completed by the insertion of the entry field and the protective field, is stored in the optical disk of the file server 203. At this time, a form manager for managing the form prepared is designated and registered.

When the slip form is stored in the optical disk as described above, the slip is entered on the basis of this slip form. For this purpose, a desired slip form is read from the optical disk accommodated in the file server 203.

The slip form thus read is not such that entry is possible in every portion thereof. Only entry in the entry field or the protective field is permitted. The remaining portions of the form are those for which entry is not assumed to be made, so that editing such as entry and correction is not allowed for these portions.

The entry in the entry field can be subjected to a check concerning entry conditions, such as type of characters, if required. In usual cases the entry is accepted as it is. Then, the user's name, i.e., the entrant's name, together with the input data, is stored, with a new record number attached thereto, in a new area of the aforementioned optical disk accommodated in the file server 203 as separate data from the slip form. The reason why the scope of entrants is not restricted is that the data entered is newly registered each time it is entered. This is also the reason why the data is arranged to be stored in the optical disk in which the data written therein is impossible to correct.

The entry in the protective field of the slip data prepared in the above-described manner is accepted only when the person has the write by referring to the attribute data written in the optical disk.

In the cases where a person having only the read right or a person having neither the write right nor the read right have attempted an entry, error processing is effected. In cases where a person having the write right has made an entry in the slip, the user's name (see FIG. 3) of the person who made an entry, together with the input data, is also recorded in a relevant area of the optical disk so as to record its history.

Figure 5:
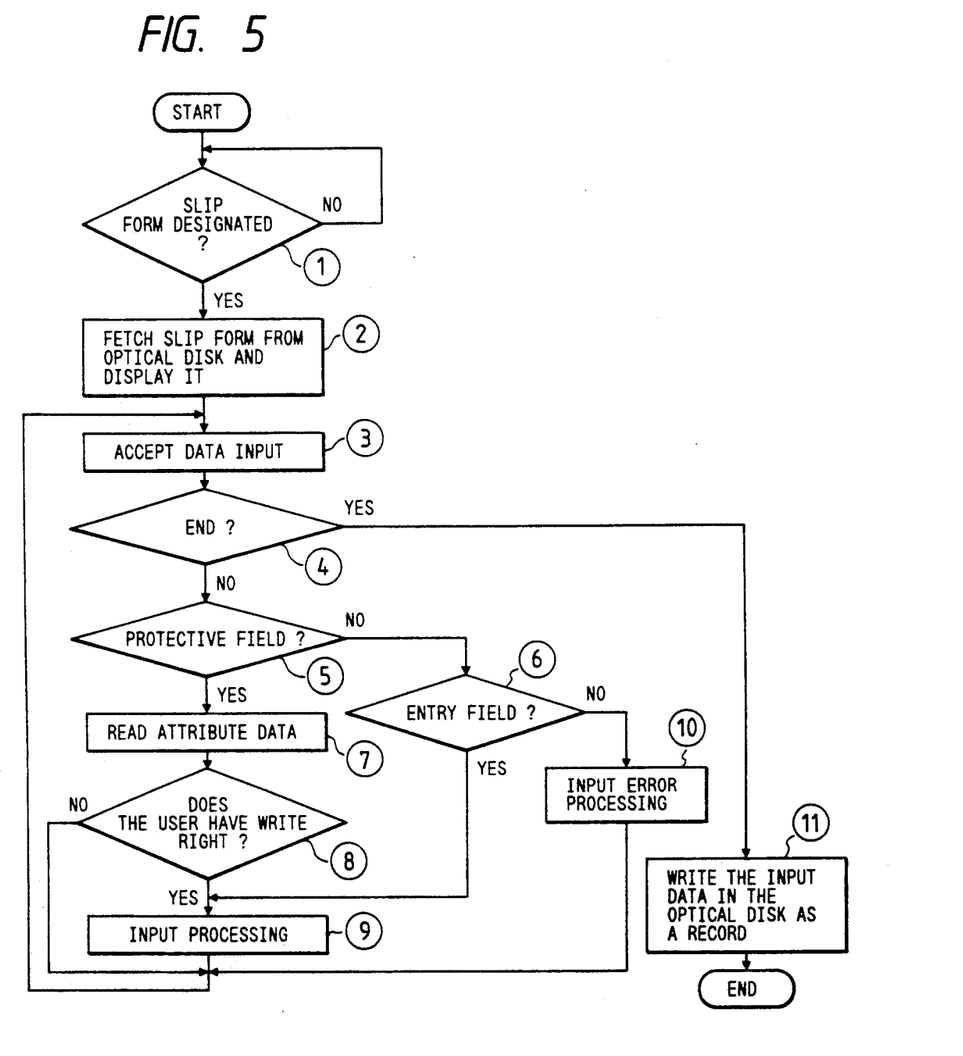
FIG. 5 is a flow chart illustrating the manner in which slip data is inputted.

FIG. 5 illustrates the manner in which the above-described slip data is entered. When the slip form is designated by the operator (Step 1 in FIG. 5; Y), the CPU 21 shown in FIG. 1 reads and displays a slip form from the optical disk accommodated in the file server 203 (Step 2). Then, the operation proceeds to the state of acceptance of input data (Step 3), and when the data is entered, it is accepted. Subsequently, insofar as the data input is not set in a completed state (Step 4; N), a check is conducted of the area of the slip the accepted data has been designated to be entered (Steps 5, 6).

Then, as a result of this check, if the entry in the protective field has been designated (Step 5; Y), attribute data is read (Step 7), if the operator (use) has the write right (Step 8; Y), input processing is effected (Step 9). Subsequently, the operation returns to Step 3, and unless the operation reaches the end, ensuing input processing is executed.

On the other hand, if the operator does not have the write right (Step 8; N), input processing is rejected, and the operation proceeds to Step 3.

In addition, in cases where acceptance of data in an area other than the protective field and the entry field has been effected (Step 6; N), the operator is informed of the fact that input is an error by displaying it on the screen or sounding a buzzer (Step 10), and the operation proceeds to Step 3.

When the progress is made in the entry of the slip data in the above-described manner and the entry is finally completed (Step 4; Y), the input data is written in a new area of the optical disk (Step 11), thereby completing the operation of entering the slip data (End).

A description will now be given of cases where a further entry in the slip thus entered are carried out.

Figure 6:
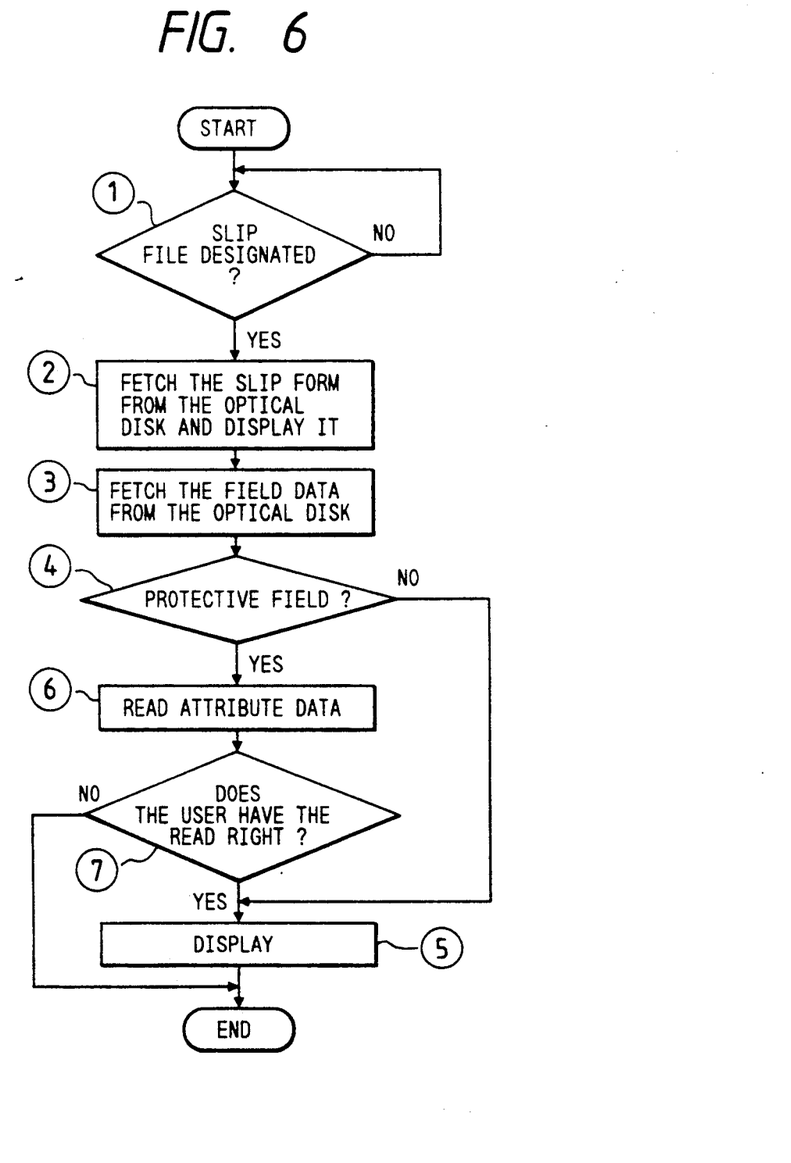
FIG. 6 is a flowchart illustrating the manner of processing by the work station in a case where a request is made for reference to an already entered slip.

FIG. 6 illustrates the manner of processing by the work station in a case where a request is made for reference to an already entered slip. Under conditions where the work station 202 has been set in the entry mode for entering in the slip, if the operator designates reference to an already entered slip (Step 1 in FIG. 6; Y), the work station 202 reads a slip form from the aforementioned optical disk accommodated in the file server 203 and displays it on the bit map display 13 (see FIG. 1) (Step 2). Then, the work station 202 reads the format (field data) of the slip data from the same optical disk (Step 3).

By using the field data thus read, the CPU 21 (see FIG. 1) checks whether or not the slip data contains the protective field (Step 4). If the protective field does not exist (N), the portion of the actual data of the slip data is read, and is displayed on the bit map display 13 with the data superimposed on the slip form (Step 5).

If the protective field exists (Step 4; Y), a confirmation must be made as to whether or not the operator (user) who has opened the document has the read right. Therefore, the attribute data is read (Step 6). If it is determined as a result that the operator has the read right (Step 7; Y), the portion of the actual data of the slip data is read, and is displayed on the bit map display 13 with the data superimposed on the slip form (Step 5).

If it is determined that the operator does not have the read right (Step 7; N), the display of the actual data with respect to the slip is not carried out, and the operation of reference to the slip ends (End). At that juncture, it goes without saying that the work station 202 may display on the bit map display 13 the reason why reading is impossible.

With respect to an already entered slip, there are cases where an entry for giving approval, for instance, is made in addition to reference thereto.

Figure 7:
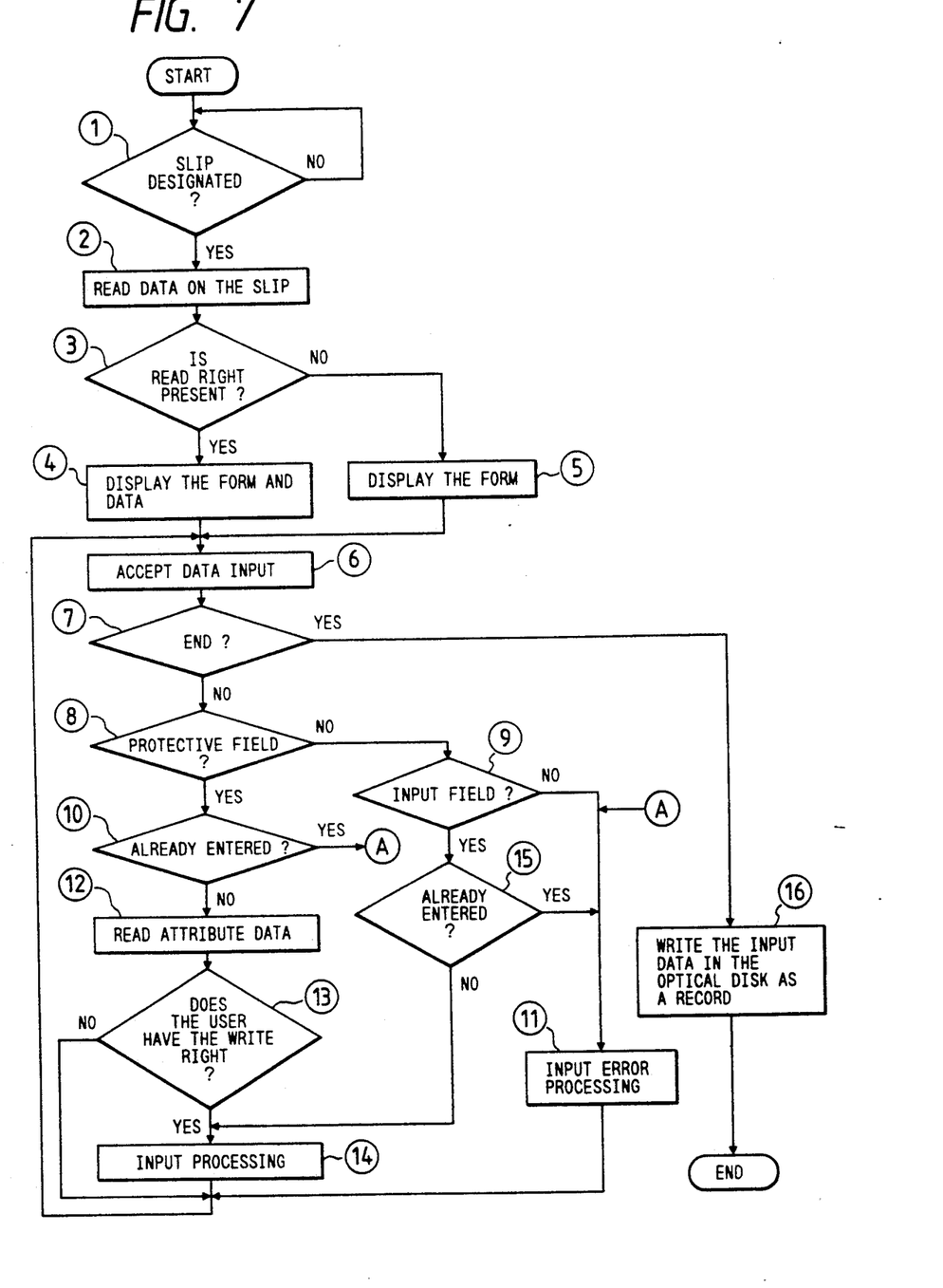
FIG. 7 is a flowchart illustrating the manner in which the work station is controlled in a slip entering mode.

FIG. 7 illustrates the manner in which the work station is controlled in the slip entering mode.

When the operator designates writing in an already entered slip (Step 1 in FIG. 7; Y), the work station 202 reads data concerning that slip from the optical disk accommodated in the file server 203 (Step 2), and checks the relationship between the attribute data and the operator's authority (Step 3). Then, if it is determined that the read right exists (Y), the form of the slip and the data already input, if any, are displayed on the bit map display 13 (Step 4). In other cases, only the form of the slip is displayed on the bit map display 13 (Step 5). Subsequently, the operation for the work station 202 proceeds to a state for accepting input data (Step 6). Then, unless data input becomes a completed state (Step 7; N), a check is made of which area of the slip the accepted data has been designated to be entered (Steps 8, 9).

As a result of this check, if entry in the protective field has been designated (Step 8; Y), a check is made of whether or not entry has already been made (Step 10). If YES is the answer (Y), input error processing is effected to reject a new entry (Step 11).

On the other hand, if entry has not been made in the protective field (N), the attribute data is referred to (Step 12), and if the operator has the write right (Step 13; Y), input processing is executed (Step 14). The operation then returns to Step 6 to effect ensuing input processing insofar as the entry is completed.

If the operator does not have the write right (Step 13; N), processing of the input data is not carried out.

On the other hand, if entry in the entry field is made (Step 9; Y), when data has already been entered (Step 15; Y), input error processing is effected (Step 11), while if data has not been entered (Step 15; N), input processing is executed (Step 14).

When progress is made in the entry of the slip data in the above-described manner and the entry is finally completed (Step 7; Y), the input data is written in the optical disk (Step 16), thereby completing the operation of entering the slip data (End).

Thus, it is possible to enter data in the field in which data has not been entered, in correspondence with its attributes. However, once an entry is made and its contents are confirmed, any further writing in or correction of the contents is not allowed. Naturally, the contents display 13 can be printed out and can be transferred to another document. In other words, operations that can be effected with respect to documents in general can be applied to this documentation management system as well.

SCRAPPING OF ALREADY ENTERED SLIPS

A description will now be given of the scrapping of already entered slips. The scrapping of slips in which entries have been made can be effected only by the form manager designated at the time of registration of the slip form. In addition, even when the form manager effects the scrapping, the slip data itself does not completely disappear. Rather, a deletion mark representing that the data has been deleted is only attached to the slip data. Hence, the data itself remains, so that reference thereto is possible.

Figure 8:
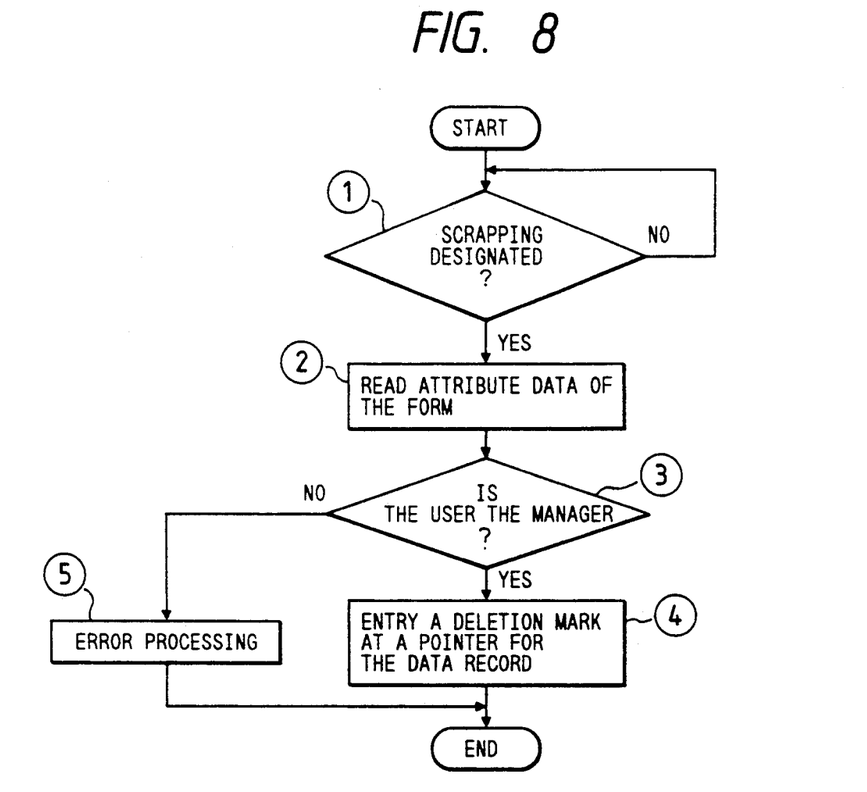
FIG. 8 is a flowchart illustrating the manner of control concerning the scrapping of an already entered slip.

FIG. 8 illustrates the manner of control in scrapping an already entered slip. When the operator designates the scrapping of the already entered slip (Step 1 in FIG. 8; Y), the CPU 21 reads the attribute data of the slip form (Step 2). Then a determination is made on the basis of it as to whether or not the operator (user) is the form manager (Step 3). If he or she is the form manager (Y), a deletion mark representing the deletion of the document is entered in the pointer indicating the record of the relevant slip data, thereby completing an operation for scrapping the slip. If a person other than the form manager has designated the scrapping of the slip (Step 3; N), the input is processed as being an error, and the scrapping of the slip is not effected (Step 5).

CORRECTION OF ALREADY ENTERED SLIPS

A description will now be given of a case where there has been an error in the already entered slip. The slip, once entered, cannot be corrected so as to ensure its accuracy, as already mentioned above. Accordingly, when there has been an error in the already entered slip, scrapping is effected in the procedure described in connection with FIG. 8, and the slip form is read again so as to reissue a slip.

Since it is possible to view the scrapped slip, as required, the history of correcting an error of the slip becomes clear.

SUSPENSION OF USE OF SLIP FORM

Since the slip form is stored in the file server 203, anybody can access it by using the work station 202. However, there are cases where the form of the slip undergoes change such as when the form of transactions of the corporation or the like using the slip changes, or modifications of the slip are made. In addition, there are cases where the slip itself becomes unnecessary due to a change in transactions or the like. Furthermore, there are cases where a part of all the slip form currently in use must be rearranged due to the overflow of the record numbers of the optical disk. In such cases, the form manager is capable of suspending the use of the slip form. By granting this right exclusively to the form manager, it is possible to prevent a situation in which the slip form is made unusable due to a mistake or an undue reason.

SPECIFIC EXAMPLES OF PREPARATION OF A SLIP

A brief description will now be given of the actual preparation of a slip by citing by a way of illustration a case in which a "purchase request slip" is prepared in this documentation management system.

Figure 9:
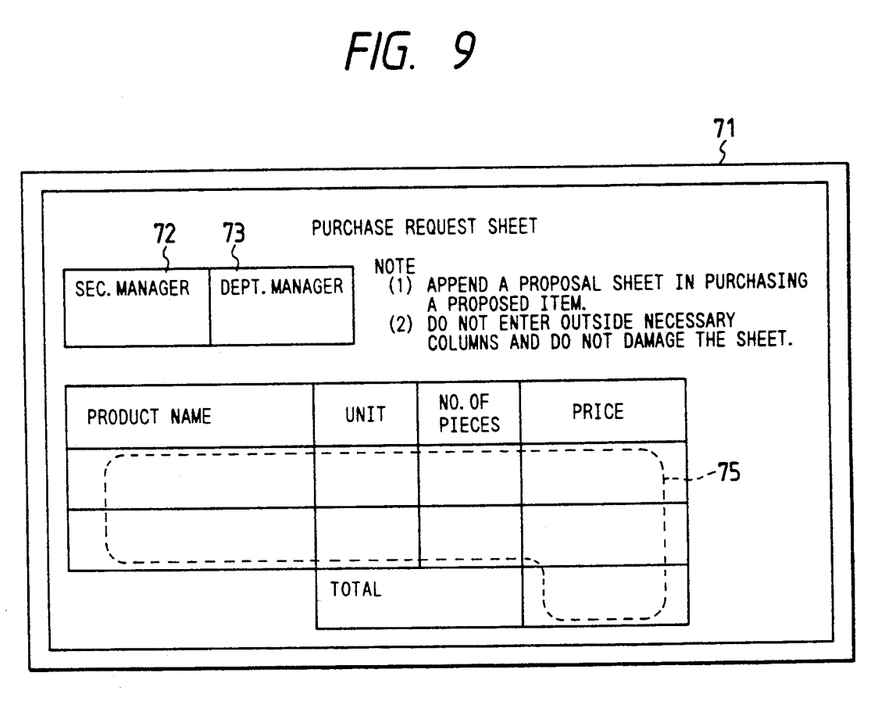
FIG. 9 is a plan view illustrating an example of a form of a purchase request slip.

FIG. 9 illustrates an example of the slip form of the purchase request slip. Columns for approval by a section manager and a department manager are provided in a upper left portion of this slip form 71, respectively constituting protective fields 72, 73. Provided below these columns are a column for entering the "Product name", "Unit price", "No. of pieces", and "Price", and a column for entering the "Total". These columns constitute an entry field 75.

It is assumed that the form manager of the slip is "a". The form manager "a" defines the two fields 72, 73 as protective fields with respect to the slip form 71. As its attributes, each of the protective fields requires the user's name having the write right and the user's name having only the read right.

It is assumed that the field 72 is set in such a manner that a section manager "b" has the write right, and all of the users have the read right. The other field 73 is set in such a manner that a department manager "c" has the write right, and all of the users have the read right.

The issuer of the slip is assumed to be "d". The issuer "d" reads the slip from the optical disk, and performs the operation of entering data in the entry field 75. Upon completion of the operation of entering data, this slip data is transferred to the file server 203.

The file server 203 stores the transferred slip data in the optical disk, and informs the section manager "b" serving as a first approver of a record number of the slip data and the type of slip form. This is effected by using, for instance, the mail server shown in FIG. 10.

Upon receipt of this notification, the section manager "b" reads the slip form and the slip data from the file server 203. Then, the section manager "b" effects an entry (approval) in the field 72 by confirming the contents of the slip, transfers the slip data to the file server 203. The file server 203 this time informs the department manager "c" of the record number and the type of the slip form in accordance with the sequence of approval. In cases where the documentation management system is not provided with the function of effecting such sequential management, the section manager "b" may prepare electronic mail independently and inform the department manager "c" of the record number and the type of the slip form. Also, the department manager "c" similarly confirms the contents of the slip and enters (approves) in his or her field 73.

When the slip with completed slip data is stored in the file server 203, accounting personnel are notified of the record number and the type of the slip form. The accounting personnel read the slip from the slip data, and effect necessary accounting processing.

Although in the above-described embodiment the documentation management system is realized by using as a basis an existing documentation system shown in FIG. 10, the present invention is not restricted to the same. For instance, an arrangement may be alternatively provided such that a special server called an "approval server" is provided in the network, and a write only storage device such as an optical disk is provided in the approval server, so that the nucleus of various functions of slip management, including registration and retrieval of a slip form, entry of slip data, approval management, and data retrieval are realized. In this case, various document processors on the terminal side, such as work stations, effect the preparation and processing of slips via this approval server.

If such a special server is provided, its functions can be made independent, so that the validity of the system is further ensured.

Although in this embodiment the optical disk is used under the precondition that only the writing of slip data and the like is effected, it is possible to employ other writing only storage media as well. In addition, although the storage medium itself may be rewritable, naturally such a medium is applicable to the present invention if rewriting therein is restricted by some means or other.

As described above, in accordance with a first aspect of the invention, since form storage means and data storage means are provided separately for a document, it is possible to prepare the document by accessing the form itself of the document a multiplicity of times. In addition, since an arrangement is provided such that at least one first area and at least one second area can be set in one document, an area(s) where only a particular person or persons are allowed to read data and an area(s) where only a particular person or person are allowed to enter data can be set even in one document. Furthermore, since the form storage means and the data storage means are disposed outside the document processor via cables, it is possible to enhance reliability concerning the preparation and management of slips as compared to a case where they are disposed inside the document processor.

In addition, in accordance with a second aspect of the invention, since form storage means and data storage mean are provided separately for a slip, it is possible to prepare a document by accessing the form itself of the slip a multiplicity of times. In addition, since an arrangement is provided such that at least one first area and at least one second area can be set in one slip, one area(s) where only a particular person or persons are allowed to read data and an area(s) where only a particular person or persons are allowed to enter data can be set even in one slip. Furthermore, since the form storage means and the data storage means are disposed outside the document processor via cables, it is possible to enhance reliability concerning the preparation and management of slips, as compared to a case where they are disposed inside the document processor.

In addition, in accordance with a third aspect of the present invention, since the form storage means and the data storage means are constituted by storage means incapable of rewriting, represented by an optical disk, even if the deletion of scrapping of a sentence is effected, its contents are preserved. It is possible to investigate the history of the document, so that the reliability of the documents can be ensured.

In accordance with a fourth aspect of the invention, since the documentation management system is incorporated into a local area network, it is possible to structure a flexible system which provides opportunities of utilizing documents to each member within the network. This allows the scope of persons making use of documents to be restricted, when necessary. In addition, by making use of servers such as a mail sever and a communication sever, it is possible to provide the possibilities of using electronic mail and connecting the documentation management system to another local area network, thereby making more effective use of the documentation management system.

In accordance with a fifth embodiment of the present invention, since a server exclusively used for processing slips is connected to a cable constituting a part of a local area network, there is an advantage in that the validity of the system can be enhanced further by virtue of the independence of the server.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended thereto, and their equivalents.

What is claimed is:

1. A documentation management system for controlling use of a document by a first group of operators having access to read the document, and a second group of operators having access to read and write on the document comprising:
    first storage means for storing the document in a predetermined format;
    second storage means for storing data to be entered on the document;
    area designating means for designating a first area on the document in which the first and second groups of operators can read the data, and a second area on the document in which only the second group of operators can write the data; and
    processor means, coupled to said first and second storage means, for inputting the document format and the data, and for displaying the document format and the data.

2. A documentation management system for controlling use of a routine approval slip by a first group of operators having access to read the slip, and a second group of operators having access to read and write on the slip, comprising:
    first storage means for storing a predetermined format of a slip;
    second storage means for storing slip data to be entered on the slip;
    area designating means for designating a first area on the slip in which the first and second groups of operators can read slip data, and a second area on the slip in which only the second group of operators can write the slip data; and
    processor means, coupled to said first and second storage means, for inputting the slip format and slip data, and for displaying the slip format and the slip data.

3. A documentation management system according to claims 1 or 2, wherein said first and second storage means include means for preventing revision of the data.

4. A documentation management system according to claims 1 or 2, further including
cable means for a portion of a local area network;
a file server coupled to said cable means;
wherein said processor means is coupled to said first and second storage means through said cable means, and includes a work station.

5. A documentation management system according to claim 2, further including cable means for a portion of a local area network, wherein said first and second storage means are exclusively used for processing slips.

6. A document management system according to claim 1, further including cable means,
wherein the processor means is coupled to the first and second storage means through the cable means.

7. A document management system according to claim 2, further including cable means,
wherein the processor means is coupled to the first and second storage means through the cable means.

8. A document management system according to claim 3, further including cable means,
wherein the processor means is coupled to the first and second storage means through the cable means.

9. A method of operating a system for controlling use of a document by a first group of operators having access to read the documents, and a second group of operators having access to read and write on the document, the method comprising the steps of:
storing the document;
storing data to be entered on a document;
designating a first area in the document in which the first and second groups of operators can read the data, and a second area in the document in which only the second group of operators can write the data.

10. A documentation management system for controlling use of a document by a first group of operators having access to read the document, and a second group of operators having access to read and write on the document comprising:
a local area network;
first storage means for storing the document in a predetermined format;
second storage means for storing data to be entered on the document;
area designating means for designating a first area on the document in which the first and second groups of operators can read the data, and a second area on the document in which only the second group of operators can write the data; and
processor means, coupled to said first and second storage means through said local area network, for inputting the document format and the data, and for displaying the document format and the data.

* * * * *